(12) United States Patent
Suciu et al.

(10) Patent No.: US 10,995,673 B2
(45) Date of Patent: May 4, 2021

(54) GAS TURBINE ENGINE WITH INTERCOOLED COOLING AIR AND DUAL TOWERSHAFT ACCESSORY GEARBOX

(71) Applicant: United Technologies Corporation, Farmington, CT (US)

(72) Inventors: Gabriel L. Suciu, Glastonbury, CT (US); Hung Duong, Unionville, CT (US); Jonathan F. Zimmitti, Glastonbury, CT (US); William G. Sheridan, Southington, CT (US); Michael E. McCune, Colchester, CT (US); Brian Merry, Andover, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 549 days.

(21) Appl. No.: 15/410,113

(22) Filed: Jan. 19, 2017

(65) Prior Publication Data
US 2018/0202368 A1 Jul. 19, 2018

(51) Int. Cl.
*F02C 7/32* (2006.01)
*F02C 3/06* (2006.01)
(Continued)

(52) U.S. Cl.
CPC ................ *F02C 7/32* (2013.01); *F01D 15/10* (2013.01); *F01D 15/12* (2013.01); *F01D 25/12* (2013.01);
(Continued)

(58) Field of Classification Search
CPC . F02C 7/32; F01D 15/10; F01D 15/12; F01D 25/12; H02K 7/116
See application file for complete search history.

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

European Search Report for EP Application No. 17160816.9 dated Jul. 21, 2017.
(Continued)

*Primary Examiner* — Sean Gugger
(74) *Attorney, Agent, or Firm* — Carlson, Gaskey & Olds, P.C.

(57) ABSTRACT

An exemplary gas turbine engine assembly includes a first spool having a first turbine operatively mounted to a first turbine shaft, and a second spool having a second turbine operatively mounted to a second turbine shaft. The first and second turbines are mounted for rotation about a common rotational axis within an engine static structure. The first and second turbine shafts are coaxial with one another. First and second towershafts are respectively coupled to the first and second turbine shafts. An accessory drive gearbox has a set of gears. A compressor is driven by the first towershaft. The engine assembly further includes a starter generator assembly, and a transmission coupling the starter generator assembly to the first set of gears. The transmission is transitionable between a first mode where the starter generator assembly is driven at a first speed relative to the second towershaft, and a second mode where the starter generator assembly is driven at a different, second speed relative to the second towershaft.

22 Claims, 8 Drawing Sheets

(51) Int. Cl.
   *F02C 7/18*     (2006.01)
   *F02C 7/36*     (2006.01)
   *F02C 7/268*    (2006.01)
   *F01D 15/10*    (2006.01)
   *F01D 25/12*    (2006.01)
   *F16H 1/22*     (2006.01)
   *H02K 7/116*    (2006.01)
   *H02K 7/18*     (2006.01)
   *F01D 15/12*    (2006.01)
   *F02C 7/275*    (2006.01)

(52) U.S. Cl.
   CPC .............. *F02C 3/06* (2013.01); *F02C 7/185* (2013.01); *F02C 7/268* (2013.01); *F02C 7/275* (2013.01); *F02C 7/36* (2013.01); *F16H 1/222* (2013.01); *H02K 7/116* (2013.01); *H02K 7/1823* (2013.01); *F05D 2220/32* (2013.01); *F05D 2260/4031* (2013.01); *F05D 2260/85* (2013.01)

(56) References Cited

U.S. PATENT DOCUMENTS

| | | |
|---|---|---|
| 4,254,618 A | 3/1981 | Elovic |
| 4,539,945 A | 9/1985 | Bosisio |
| 4,882,902 A | 11/1989 | Reigel et al. |
| 5,056,335 A | 10/1991 | Enninger et al. |
| 5,269,135 A | 12/1993 | Vermejan et al. |
| 5,305,616 A | 4/1994 | Coffinberry |
| 5,392,614 A | 2/1995 | Coffinberry |
| 5,414,992 A | 5/1995 | Glickstein |
| 5,452,573 A | 9/1995 | Glickstein et al. |
| 5,498,126 A | 3/1996 | Pighetti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 6,050,079 A * | 4/2000 | Durgin ................ F01D 5/082 415/115 |
| 6,065,282 A | 5/2000 | Fukue et al. |
| 6,134,880 A | 10/2000 | Yoshinaka |
| 6,430,931 B1 | 8/2002 | Horner |
| 6,487,863 B1 | 12/2002 | Chen et al. |
| 6,612,114 B1 | 9/2003 | Klingels |
| 6,892,523 B2 | 5/2005 | Fetescu et al. |
| 7,237,386 B2 | 7/2007 | Hoffmann et al. |
| 7,246,484 B2 | 7/2007 | Giffin et al. |
| 7,284,377 B2 | 10/2007 | Joshi et al. |
| 7,306,424 B2 | 12/2007 | Romanov et al. |
| 7,334,412 B2 | 2/2008 | Tiemann |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seltzer et al. |
| 7,882,691 B2 | 2/2011 | Lemmers, Jr. et al. |
| 7,886,520 B2 | 2/2011 | Stretton et al. |
| 7,997,085 B2 | 8/2011 | Moniz et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,347,637 B2 | 1/2013 | Suciu et al. |
| 8,350,398 B2 | 1/2013 | Butt |
| 8,397,487 B2 | 3/2013 | Sennoun et al. |
| 8,402,742 B2 | 3/2013 | Roberge et al. |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 | 12/2013 | Suciu et al. |
| 8,621,871 B2 | 1/2014 | McCune et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergman et al. |
| 9,234,481 B2 | 1/2016 | Suciu et al. |
| 9,243,563 B2 | 1/2016 | Lo |
| 9,255,492 B2 | 2/2016 | Bacic |
| 9,297,391 B2 | 3/2016 | Rued et al. |
| 9,422,063 B2 | 8/2016 | Diaz |
| 9,429,072 B2 | 8/2016 | Diaz et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2005/0183540 A1* | 8/2005 | Miller ................ F02C 7/32 74/665 GA |
| 2007/0022735 A1 | 2/2007 | Henry et al. |
| 2007/0130959 A1 | 6/2007 | Linet et al. |
| 2007/0173365 A1 | 7/2007 | Linet et al. |
| 2007/0213917 A1 | 9/2007 | Bruno et al. |
| 2007/0245738 A1 | 10/2007 | Stretton |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0056306 A1* | 3/2009 | Suciu ................ F02K 3/06 60/226.1 |
| 2009/0090096 A1 | 4/2009 | Sheridan |
| 2009/0145102 A1 | 6/2009 | Roberge et al. |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2009/0302152 A1 | 12/2009 | Knight |
| 2010/0043396 A1 | 2/2010 | Coffinberry |
| 2010/0133832 A1* | 6/2010 | Butt ................ B64C 11/48 290/46 |
| 2010/0154434 A1 | 6/2010 | Kubota et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 | 10/2011 | Glahn et al. |
| 2012/0067055 A1 | 3/2012 | Held |
| 2012/0102915 A1 | 5/2012 | Baltas |
| 2012/0159961 A1 | 6/2012 | Krautheim et al. |
| 2012/0180509 A1 | 7/2012 | DeFrancesco |
| 2013/0036747 A1 | 2/2013 | Fuchs et al. |
| 2013/0067928 A1 | 3/2013 | Arias Chao et al. |
| 2013/0098059 A1 | 4/2013 | Suciu et al. |
| 2013/0145744 A1 | 6/2013 | Lo et al. |
| 2013/0145774 A1 | 6/2013 | Duong et al. |
| 2013/0186102 A1 | 7/2013 | Lo |
| 2013/0199156 A1 | 8/2013 | Ress, Jr. et al. |
| 2013/0239583 A1 | 9/2013 | Suciu et al. |
| 2013/0319002 A1 | 12/2013 | Sidelkovskiy et al. |
| 2014/0020506 A1* | 1/2014 | Duong ................ F16H 1/222 74/665 GB |
| 2014/0137417 A1 | 5/2014 | Silberberg et al. |
| 2014/0196469 A1 | 7/2014 | Finney et al. |
| 2014/0230444 A1 | 8/2014 | Hao et al. |
| 2014/0250898 A1 | 9/2014 | Mackin et al. |
| 2014/0260326 A1 | 9/2014 | Schwarz et al. |
| 2014/0311157 A1 | 10/2014 | Laurello et al. |
| 2014/0341704 A1 | 11/2014 | Fletcher |
| 2014/0352315 A1 | 12/2014 | Diaz |
| 2015/0114611 A1 | 4/2015 | Morris et al. |
| 2015/0285147 A1 | 10/2015 | Phillips et al. |
| 2015/0308339 A1 | 10/2015 | Forcier |
| 2015/0330236 A1 | 11/2015 | Beecroft et al. |
| 2015/0354465 A1 | 12/2015 | Suciu et al. |
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |
| 2016/0215732 A1 | 7/2016 | Malecki |
| 2016/0237906 A1* | 8/2016 | Suciu ................ F02C 7/18 |
| 2016/0312797 A1* | 10/2016 | Suciu ................ F01D 25/12 |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |

(56) References Cited

U.S. PATENT DOCUMENTS

| | | | |
|---|---|---|---|
| 2017/0022905 A1* | 1/2017 | Orosa | F02C 9/18 |
| 2017/0044980 A1 | 2/2017 | Duesler et al. | |
| 2017/0044982 A1* | 2/2017 | Duesler | F02C 7/141 |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1* | 6/2017 | Moniz | F02C 7/14 |
| 2017/0204787 A1 | 7/2017 | Duesler et al. | |
| 2017/0298826 A1* | 10/2017 | Ryznic | F02C 7/18 |
| 2018/0045119 A1* | 2/2018 | Sheridan | F02C 7/32 |
| 2018/0156121 A1* | 6/2018 | Snape | F02C 7/185 |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

European Search Report for European Application No. 16180657.5 dated Dec. 16, 2016.
European Search Report for European Application No. 16202876.5 dated Apr. 24, 2017.
European Search Report for Application No. 16178207.3 dated Nov. 21, 2016.
European Search Report for European Application No. 16175760.4 dated Nov. 16, 2016.
European Search Report for European Application No. 16175552.5 dated Nov. 17, 2016.
European Search Report for European Application No. 16175533.5 dated Nov. 15, 2016.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
Extended European Search Report for European Patent Application No. 18152645 completed Jun. 7, 2018.

* cited by examiner

GAS TURBINE ENGINE WITH INTERCOOLED COOLING AIR AND DUAL TOWERSHAFT ACCESSORY GEARBOX

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

As known, the turbine components see very high temperatures. As such, it is known to deliver cooling air to the turbine. In particular, reducing a size of an engine core can increases the compressor exit pressures and temperatures and, at the same time, increase the turbine temperatures The higher temperatures and pressures at the upstream end of the turbine section raise cooling challenges. This is where one branch of the cooling air is typically delivered. As such, the cooling air must be at a sufficiently high pressure that it can move into this environment.

Historically, air from near a downstream end of the compressor section has been tapped to provide cooling air. However, with a greater emphasis on engine fuel burn, the efficient use of all air delivered into the core engine becomes more important. As such, utilizing air which has already been fully compressed is undesirable.

Recently, it has been proposed to tap the cooling air from a location upstream of the downstream most location in the compressor. This air is then passed through a boost compressor, which increases its pressure such that it now can move into the turbine section.

A typical gas turbine engine utilizes one or more gearboxes to drive accessory components, such as generators, fuel pumps, and oil pumps. Each of the accessory drive components must be driven at a desired rotational speed. As a result, the accessory is coupled to either the low or high speed spool and geared accordingly to obtain the speed at which the accessory operates more efficiently.

One gearbox has been proposed in which the accessory drive components are driven by a single towershaft. Other gearboxes have been proposed in which some accessory drive components are driven by a first towershaft, and other accessory drive components are driven by a second towershaft.

SUMMARY

In one exemplary embodiment a gas turbine engine assembly includes a first spool having a first turbine operatively mounted to a first turbine shaft, and a second spool having a second turbine operatively mounted to a second turbine shaft. The first and second turbines are mounted for rotation about a common rotational axis within an engine static structure. The first and second turbine shafts are coaxial with one another. First and second towershafts are respectively coupled to the first and second turbine shafts. An accessory drive gearbox has a set of gears. A compressor is driven by the first towershaft. The engine assembly further includes a starter generator assembly, and a transmission coupling the starter generator assembly to the first set of gears. The transmission is transitionable between a first mode where the starter generator assembly is driven at a first speed relative to the second towershaft, and a second mode where the starter generator assembly is driven at a different, second speed relative to the second towershaft.

In another example of the above described gas turbine engine assembly, the first and second turbine shafts are outer and inner shafts, respectively, and the first and second turbines are high and low pressure turbines, respectively.

In another example of any of the above described gas turbine engine assemblies, the first towershaft is configured to rotate at a higher speed than the second towershaft.

In another example of any of the above described gas turbine engine assemblies, the transmission is further transitionable to a third mode where the starter generator assembly is driven at a different, third speed relative to the second towershaft.

In another example of any of the above described gas turbine engine assemblies, the transmission is further transitionable to at least one fourth mode where the starter generator assembly is driven at a fourth speed relative to the second towershaft, the fourth speed different than each of the first, second, and third speeds.

Another example of any of the above described gas turbine engine assemblies further includes a first clutch disposed between the first towershaft and the starter generator assembly. The first clutch is configured to enable the starter generator assembly to drive the first spool through the accessory drive gearbox, and a second clutch disposed between the second towershaft and the starter generator assembly, the second clutch configured to enable the second spool to drive the starter generator assembly through the accessory drive gearbox.

In another example of any of the above described gas turbine engine assemblies, the first clutch and the second clutch are one-way mechanical clutch devices.

In another example of any of the above described gas turbine engine assemblies, the compressor is a boost compressor of an intercooled cooling air system.

Another example of any of the above described gas turbine engine assemblies further includes a compressor section having a downstream most end and a cooling air tap at a location spaced upstream from said downstream most end. The cooling air tap is passed through at least one boost compressor and at least one heat exchanger, and then passed to a turbine section to cool the turbine section.

Another example of any of the above described gas turbine engine assemblies further includes a fan driven by a speed reduction device. The speed reduction device is driven by the second turbine shaft.

In another example of any of the above described gas turbine engine assemblies, the starter generator assembly comprises a first variable frequency generator and a second variable frequency generator.

In another example of any of the above described gas turbine engine assemblies, the starter generator assembly comprises a first integrated drive generator and a second integrated drive generator.

An exemplary method of operating a gas turbine engine includes driving a first spool with a starter through a first towershaft and a first clutch to start the engine, driving a starter generator assembly through an accessory gearbox through a second clutch with a second towershaft coupled to a second spool once the engine is started, and driving a compressor through the accessory gearbox with the first towershaft once the engine is started.

Another example of the above described exemplary method of operating a gas turbine engine further includes decoupling the starter from the first spool once the first spool reaches an engine idle speed.

In another example of any of the above described methods of operating a gas turbine engine, the decoupling includes rotating the second towershaft at a speed greater than that of the starter.

In another example of any of the above described methods of operating a gas turbine engine, the compressor is a boost compressor of an intercooled cooling air system.

Another example of any of the above described methods of operating a gas turbine engine further includes a compressor section having a downstream most end and a cooling air tap at a location spaced upstream from said downstream most end, wherein the cooling air tap is passed through at least one boost compressor and at least one heat exchanger, and then passed to a turbine section to cool the turbine section.

Another example of any of the above described methods of operating a gas turbine engine further includes driving the starter generator through a transmission in a first mode so that the starter generator assembly is rotated at a first speed relative to the second towershaft, and transitioning the transmission to a second mode so that the starter generator is driven by the second towershaft and rotated at a different, second speed relative to the second towershaft.

Another example of any of the above described methods of operating a gas turbine engine further comprising transitioning the transmission to a third mode; and driving the transmission with the second towershaft to rotate the starter generator assembly at a different, third speed relative to the second towershaft.

Another example of any of the above described method of operating a gas turbine engine further includes driving a fan through a speed reduction device with a shaft of the second spool.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
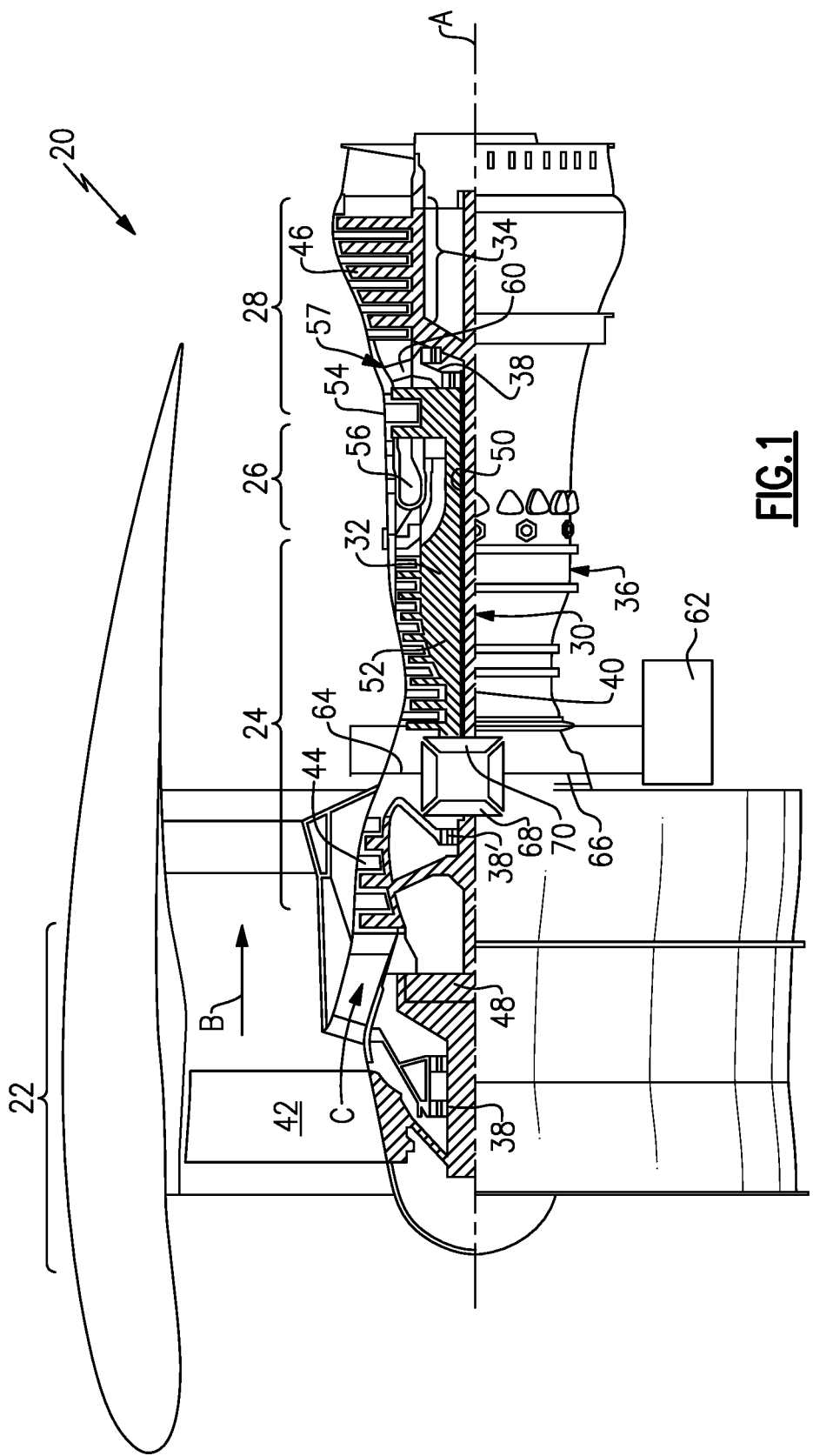
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of gear architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The example engine 20 includes a first towershaft 64 that is engaged to drive the high speed spool 32. The engine 20 further includes a second towershaft 66 that is engaged to be driven by the low speed spool 30. The low speed spool 30 includes a gear 70 and the high speed spool 32 includes a gear 68. The gear 68 is engaged to the first towershaft 64 and the gear 70 is engaged to the second towershaft 66. In one disclosed embodiment the gears 68 and 70 are bevel gears and engage corresponding bevel gears on the corresponding first or second towershaft 64, 66.

Figure 2:
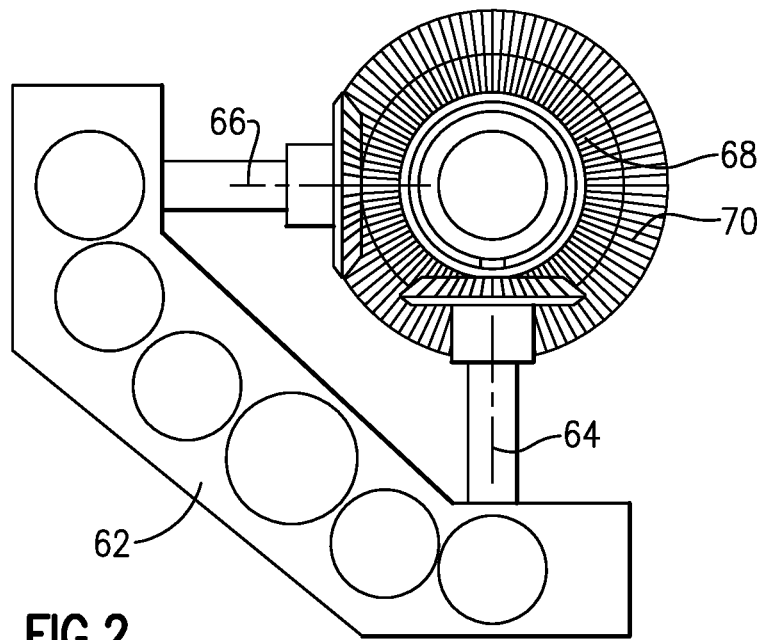
FIG. 2 is a schematic view illustrating a common accessory drive gearbox driven by both high and low speed spools.

Referring to FIG. 2 with continued reference to FIG. 1, the example gearbox 62 includes a gear engagement with both the first towershaft 64 and the second towershaft 66. The towershafts 64, 66 interface with a common accessory gearbox 62 and enable the use of the low speed spool 30 to drive the accessory components within the accessory gearbox 62.

Figure 3:
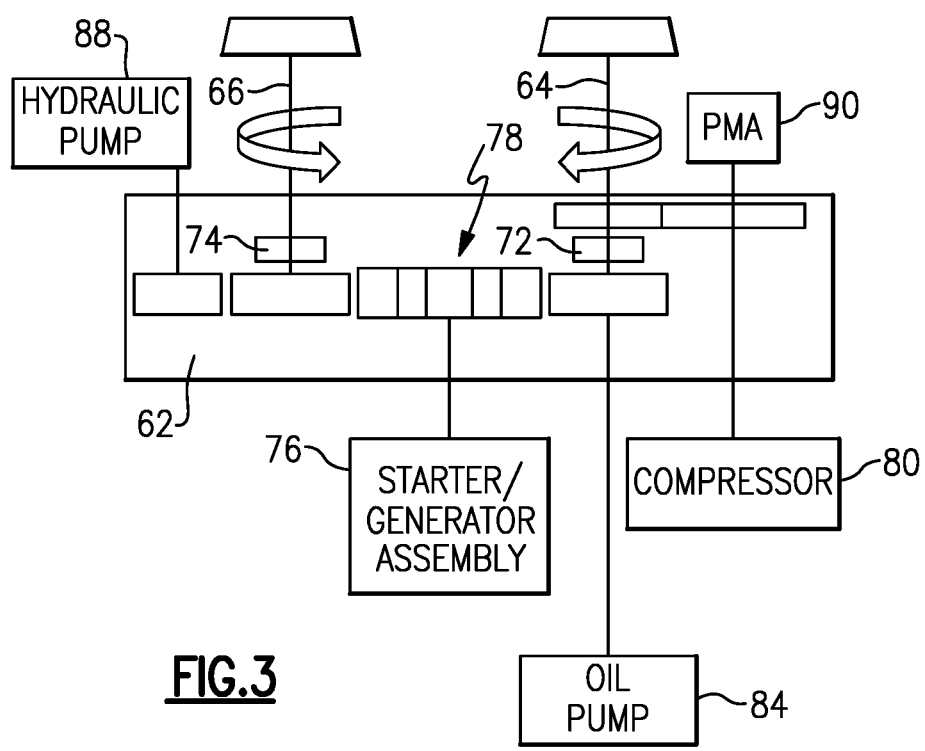
FIG. 3 is a schematic view of the example accessory gearbox of FIG. 2 and towershafts.

Referring to FIG. 3 with continued reference to FIG. 2, a first clutch 72 is engaged to the first towershaft 64 coupled to the high speed spool 32. A second clutch 74 is disposed on the second towershaft 66 driven by the low speed spool 30. Each of the clutches 74 and 72 provide for the transmission of torque in a single direction. The accessory gearbox 62 is engaged to a starter generator assembly 76 that drives a set of gears 78 meshing with both the first towershaft 64 and the second towershaft 66.

In the disclosed example, the clutches 72 and 74 are sprag clutches that only allow torque to be transmitted in one direction. When torque is reversed, meaning that the driving member becomes the driven member, the clutch will slip and allow the driving member to overspeed relative to the driven member. In this example, the second clutch 74 will allow the low rotor to drive the starter generator assembly 76, but does not allow the starter generator assembly 76 to drive low speed spool 30. In the FIG. 3 example, the first clutch 72 can be located within the accessory gearbox 62, however, the first clutch 74 may be located wherever practical to provide the selective application of torque between the starter generator assembly 76 and the first towershaft 64. Similarly, the second clutch 74 can be located wherever practical to provide selective application of torque.

The first clutch 72 is configured to allow the starter generator assembly 76 to drive the high speed spool 32 but not to allow the high speed spool 32 to drive the starter generator assembly 76. In this example, because the high speed spool 32 will rotate much faster than the starter generator assembly 76, the first clutch 72 is configured such that the high speed spool 32 may over speed past the speed of the starter generator assembly 76 and not transmit torque to the starter generator assembly 76 through the first towershaft 64.

Figure 4:
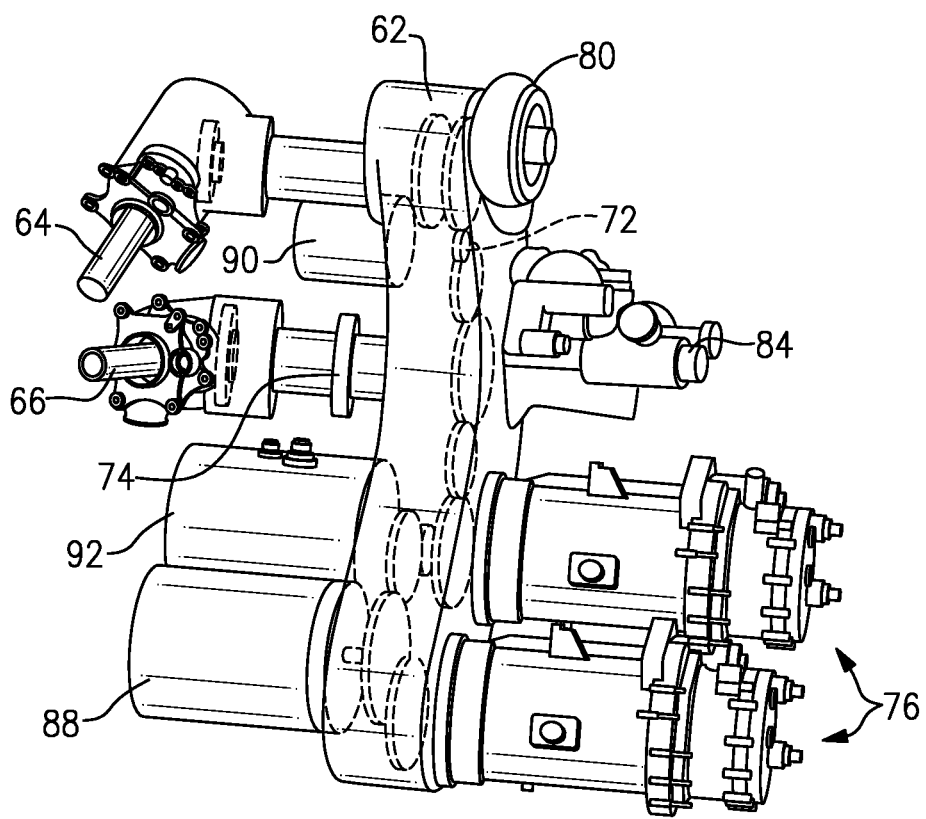
FIG. 4 is a perspective view of the accessory drive gearbox of FIG. 2 with the accessory drive components mounted thereto.

Referring now to FIG. 4 with continuing reference to FIG. 3, the accessory gearbox 62 is used to drive the starter generator assembly 76, and a number of other accessory components, including, but not limited to a compressor 80, an oil pump 84, a hydraulic pump 88, and a permanent magnet alternator (PMA) 90. The first clutch 72 is positioned such that the first towershaft 64 can selectively drive the compressor 80 and the permanent magnet alternator 90. The second clutch 74 is positioned such that the second towershaft 66 can selectively drive the oil pump 84, and further drive the hydraulic pump 88 and the starter generator assembly 76 through a transmission 92. A fuel pump (not shown) can be electrically driven and powered by the starter generator assembly 76.

After the high speed spool 32 has reached sufficient rotational speed, the first clutch 72 effectively decouples rotation of the first towershaft 64, the compressor 80, and the permanent magnet alternator 90 from the rotations of the second towershaft 66, the transmission 92, the starter generator assembly 76, the hydraulic pump 88, and the oil pump 84. This permits the first towershaft 64 to drive the compressor 80 and the permanent magnet alternator 90 while the second towershaft 66 drives the remaining accessories.

Figure 5:
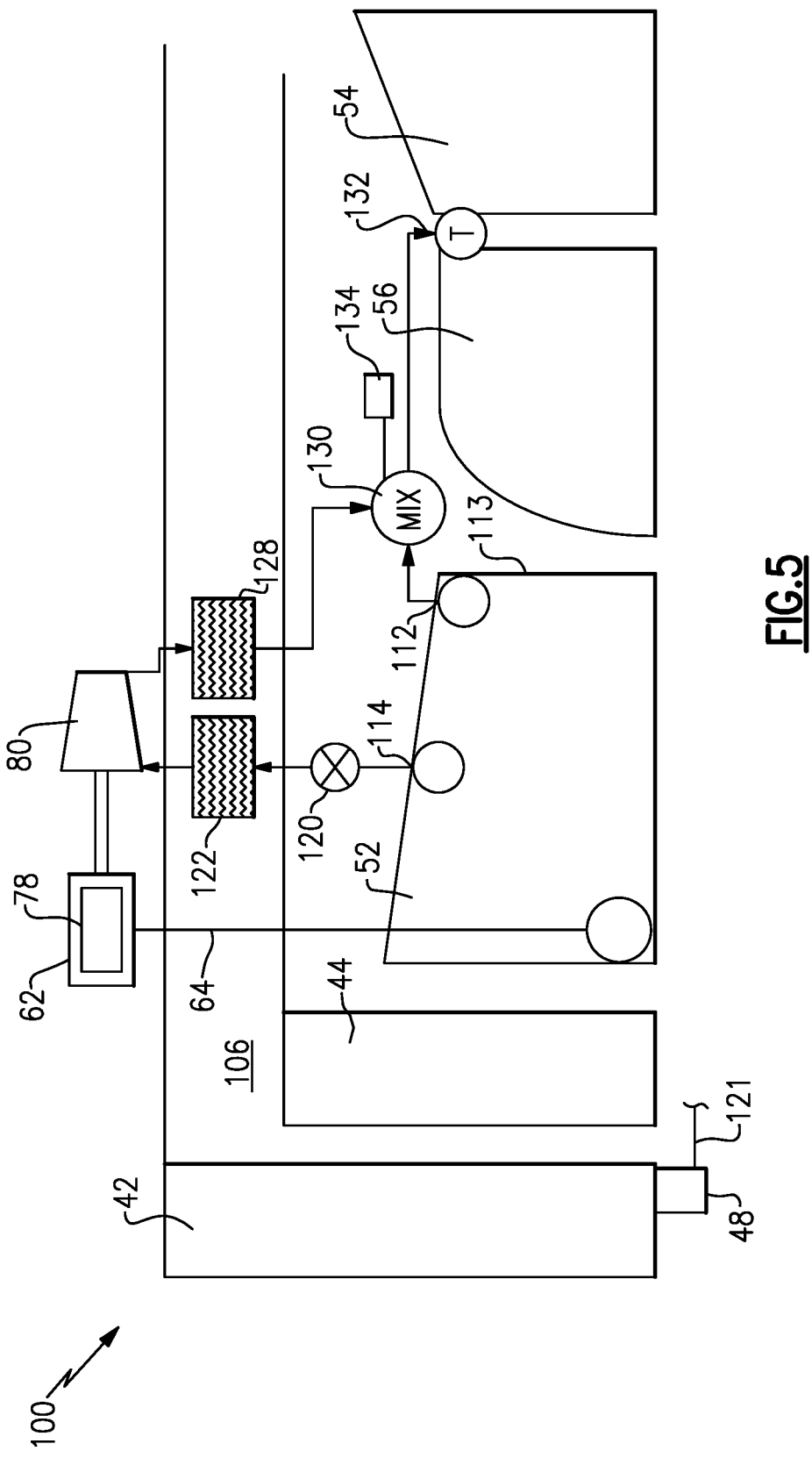
FIG. 5 is a schematic view of an intercooled cooling air system with the engine of FIG. 1.

The compressor 80, in this example, is a boost compressor pump used within an intercooled cooling air (I-CCA) system 100 as shown in FIG. 5. The system 100, generally, permits cooling the high turbine with secondary air. In the system 100, the fan 42 delivers air into a bypass duct 106 as propulsion air. The fan 42 also delivers air to the low pressure compressor 44. The air then passes into the high pressure compressor 52. A tap 112 is shown in the high pressure compressor 52 adjacent a downstream most end 113 of the compressor 52. Another tap 114 is shown at a location upstream of the downstream most end 113. Air compressed by the compressor 52 passes into the combustor 56. The air is mixed with fuel and ignited and products of this combustion pass over the high pressure turbine 54. In this embodiment, there will typically be at least a second turbine. In some embodiments, there may be a third turbine which drives the fan 42. The geared architecture 48 is shown between a shaft 121 driven by a fan drive turbine (which may be the second turbine or the third turbine, if one is included).

Air from the tap 114 is utilized as cooling air. It passes through a valve 120 to a heat exchanger 122. The air in the heat exchanger 122 is cooled by the bypass air in duct 106. Of course, other locations for the heat exchanger may be selected. Downstream of the heat exchanger 122 air passes through the compressor 80. The boost compressor 80 is driven by the first towershaft 64 through the set of gears 78 in the accessory gearbox 62.

Air downstream of the boost compressor 80 passes through a heat exchanger 128, and then to a mixing chamber 130. It should be understood that while two heat exchangers 122 and 128 are illustrated, only one heat exchanger may be needed. In the mixing chamber 130, air from the downstream location 112 is mixed with the air from the location 114 to arrive at a desired mix of temperature and pressure to be delivered at line 132 to cool the high pressure turbine 54.

As an example, at lower power operation, more air from the downstream most location 112 may be utilized with limited disadvantage to efficiency. The mixing chamber 130 may be a passive orifice feature. As long as the pressure downstream of the boost compressor 80 is higher than the air from location 112, the air from the boost compressor 80 will flow for cooling. Air from the tap 112 can make up any difference in the required flow volume. A control 134 controls the mixing chamber 130. It should be understood that the other valves and other items could also be controlled by the control 134. Control 134 may be a standalone control or may be part of a full authority digital electronic controller (FADEC).

Referring again to FIG. 4, the second towershaft 66 drives the hydraulic pump 88 and the starter generator assembly 76 through a transmission 92. The oil pump 84 is driven by the second towershaft 66, but not through the transmission 92. The rotational speed of the oil pump 84 varies linearly with the rotational speed of the second towershaft 66.

Figure 6:
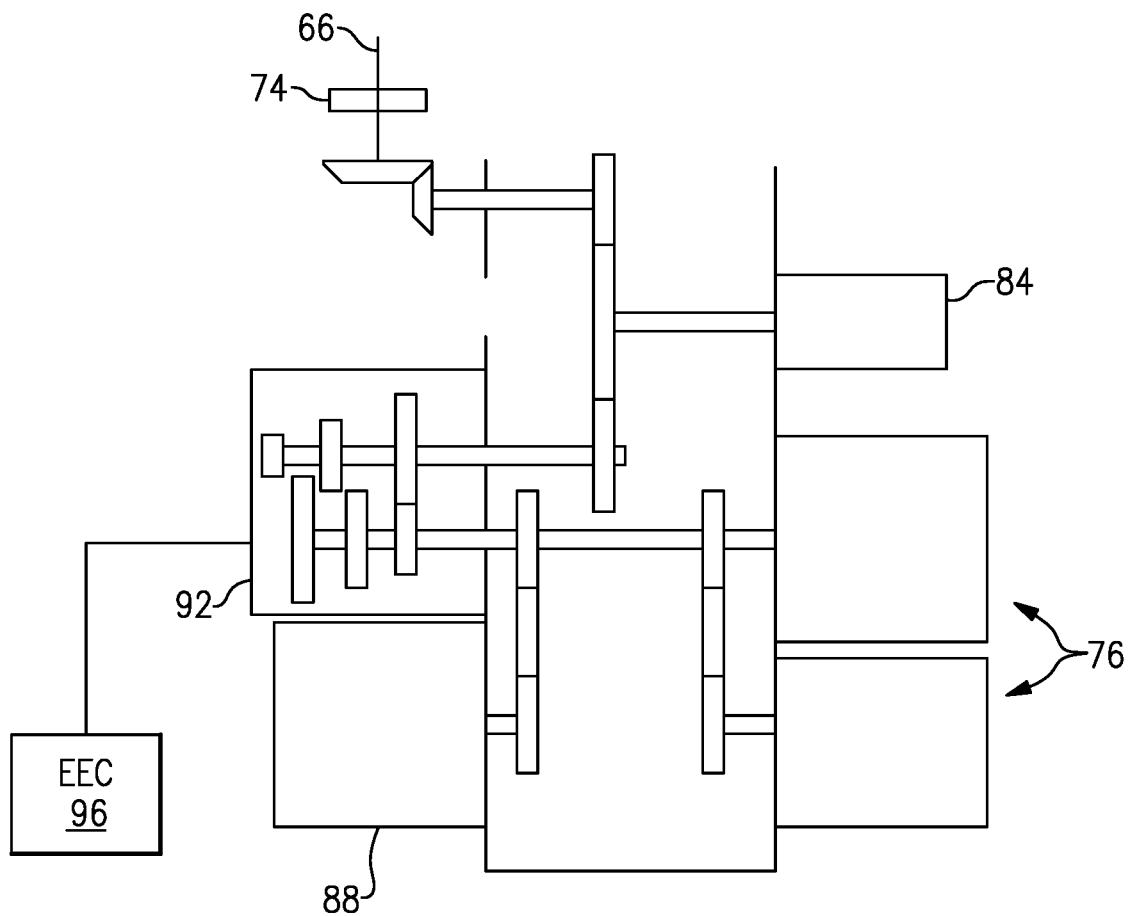
FIG. 6 shows a schematic view of a portion of the accessory drive gearbox of FIG. 4 coupled to a starter generator assembly through a transmission in a first mode.
Figure 7:
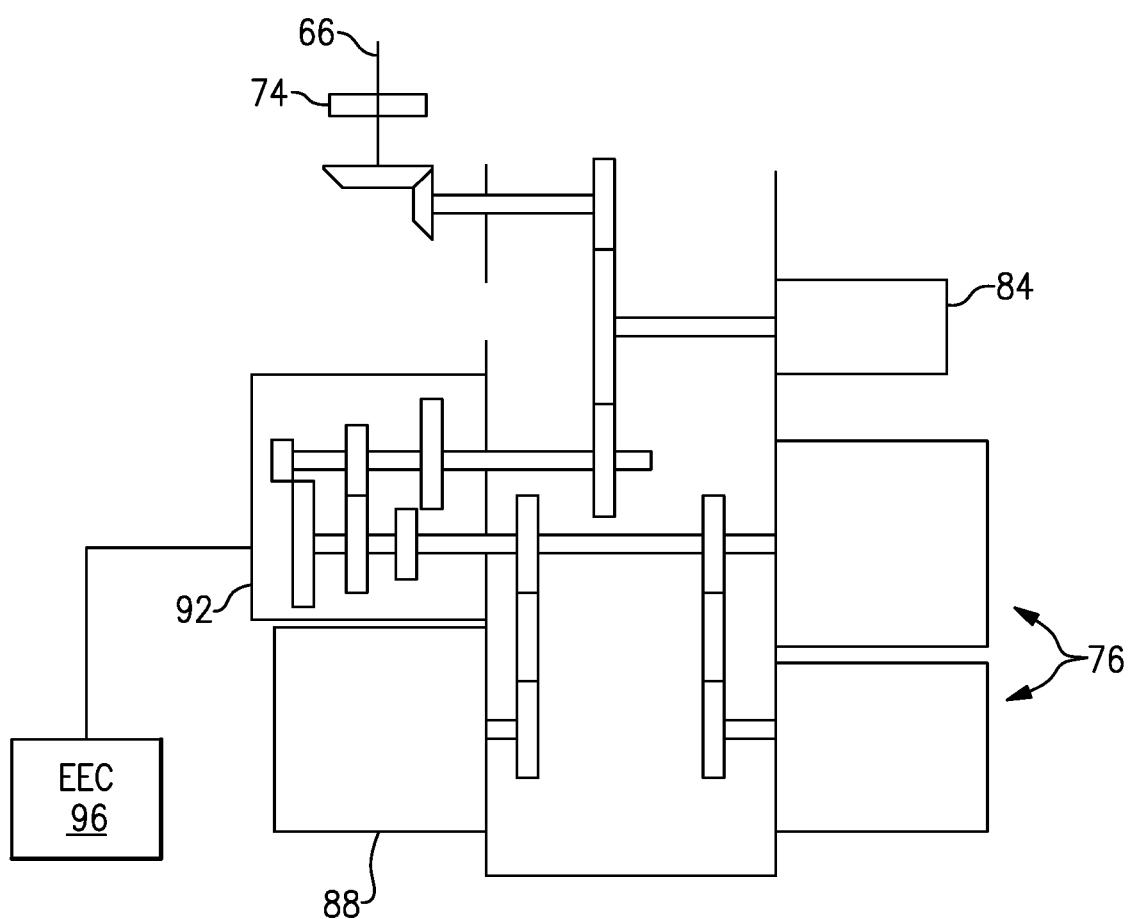
FIG. 7 shows a schematic view of a portion of the accessory drive gearbox of FIG. 4 coupled to the starter generator assembly through the transmission in a second mode.
Figure 8:
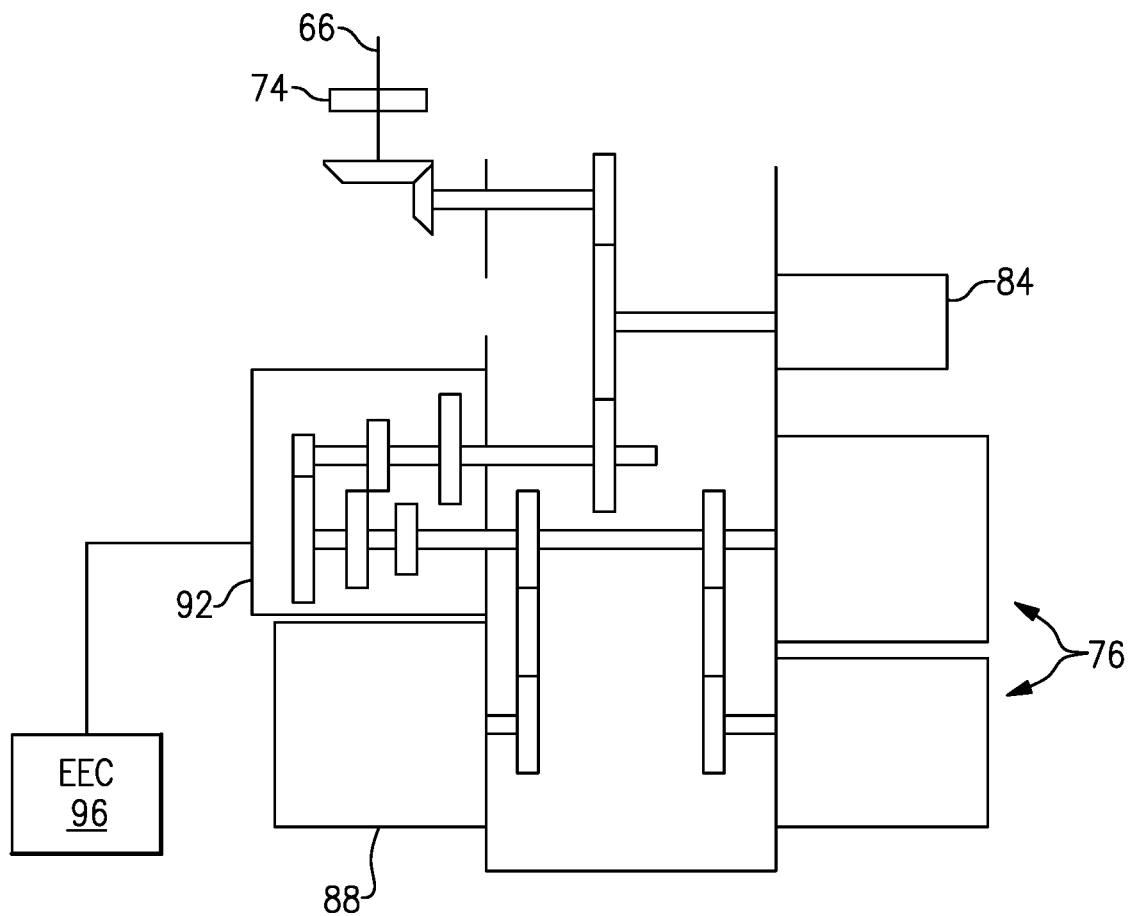
FIG. 8 shows a schematic view of a portion of the accessory drive gearbox of FIG. 4 coupled to the starter generator assembly through the transmission in a third mode.

In an exemplary non-limiting embodiment, the transmission 92 is a three-speed transmission that can transition between a first mode of shown schematically in FIG. 6, a second mode shown schematically in FIG. 7, and a third mode shown schematically in FIG. 8.

In the first mode, the transmission 92 is rotated by the second towershaft 66 and, in response, rotates the hydraulic pump 88 and the starter generator assembly 76 at a first ratio relative to a rotational speed of the second towershaft 66. In the second mode, the transmission 92 is rotated by the second towershaft 66 and, in response, rotates the hydraulic pump 88 and the starter generator assembly 76 at a different, second ratio relative to a rotational speed of the second towershaft 66. In the third mode, the transmission 92 is rotated by the second towershaft 66 and, in response, rotates the hydraulic pump 88 and the starter generator assembly 76 at a different, third ratio relative to a rotational speed of the second towershaft 66.

During operation, the inner shaft 40 can experience a greater range of rotational speeds that the outer shaft 50. That is, the speed excursion for the inner shaft 40 can be higher than the speed excursion for the outer shaft 50. In a specific non-limiting embodiment, the inner shaft 40 can operate at speed excursions of up to 80% during operation of the gas turbine engine 20, whereas the outer shaft 50 can operate at speed excursions of up to 30% during operation of the gas turbine engine 20.

The transmission 92 addresses issues associated with rotating the starter generator assembly 76 and the hydraulic pump 88 with a rotatable input from the second towershaft 66. In the exemplary embodiments, the transmission 92 operates in the first mode when the inner shaft 40 is rotating at a speed excursion of say less than 25%. If the speed excursion of the inner shaft 40 meets or exceeds 25%, but is less than 50%, the transmission 92 switches to the second mode to rotate the starter generator assembly 76 and the hydraulic pump 88. If the speed excursion of the inner shaft 40 meets or exceeds 50%, the transmission 92 switches to the third mode to rotate the starter generator assembly 76 and the hydraulic pump 88.

This permits the second towershaft 66 to drive the starter generator assembly 76 and the hydraulic pump 88 through the transmission 92 at three different ratios. The starter generator assembly 76 is thus not required to operate across a range of speed excursions from 0 up to 80% during operation of the gas turbine engine 20. Instead, due to the transmission 92, the range is no more than, say, 30% for the starter generator assembly 76 and the hydraulic pump 88. The starter generator assembly 76 can operate more efficiently when the starter generator assembly 76 and the hydraulic pump 88 is rotated across a smaller range of rotational speeds than across a larger range of rotational speeds.

An electronic engine control (EEC) 96 can control the transition of the transmission 92 between the first mode, the second mode, and the third mode. The EEC 96 could, for example, receive an input corresponding to the rotational speed of the inner shaft 40, and then transition the transmission 92 from the first mode to the second mode or the third mode when the rotational speed exceeds a threshold speed.

Although the exemplary transmission 92 can transition between three modes, other exemplary embodiments of the transmission 92 could transition between more than three modes. In such examples, the transmission 92 is rotated by the second towershaft 66 through the first set of gears 78 and, in response, rotates the starter generator assembly 76 and the hydraulic pump 88 at four or more different ratios relative to a rotational speed of the second towershaft 66.

Figure 9:
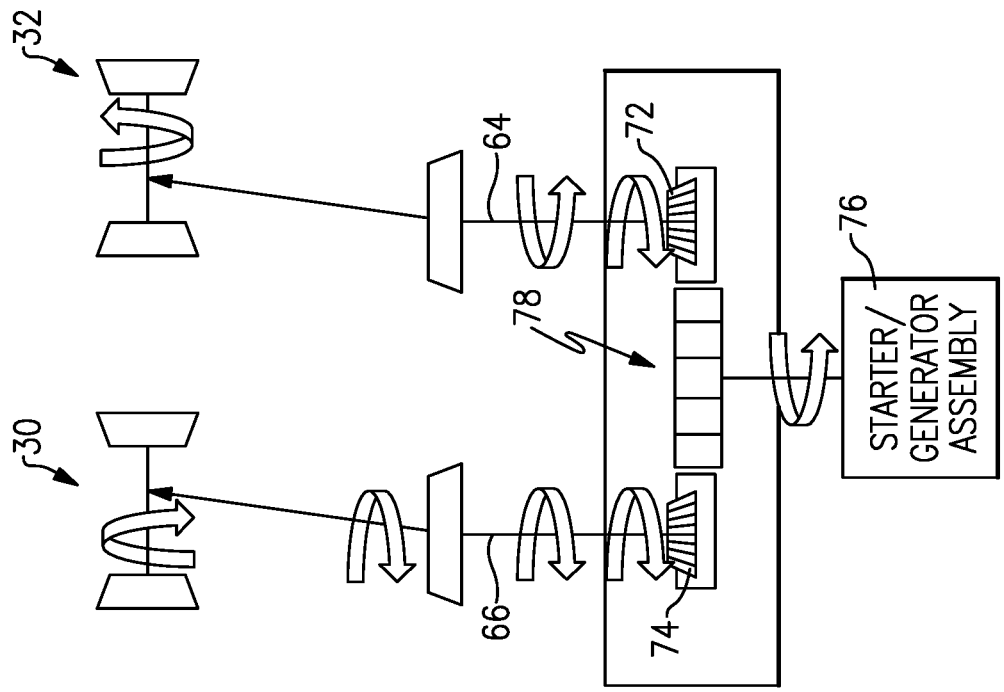
FIG. 9 is a schematic view of accessory gearbox operation during a starting process.

Referring to FIG. 9, the example accessory gearbox 62 is shown during an engine starting operation. In this schematic illustration, the starter generator assembly 76 is shown driving the set of gears 78 within the accessory gearbox 62 that, in turn, drives the first clutch 72 and thereby the first towershaft 64 to drive the high speed spool 32 up to a speed required for starting of the engine 20. The same set of gears 78 driven by the starter generator assembly 76 is also driving the second clutch 74 that is engaged to the second towershaft 66 driven by the low speed spool 30. However, in this instance, the second clutch 74 is not transmitting torque to the low speed spool 30. Accordingly, in the configuration schematically illustrated in FIG. 9, only the high speed spool 32 is turning.

Once the high speed spool 32 has been spun up to operating conditions, it will attain a speed that is much greater than that input by the starter generator assembly 76 and the first towershaft 64. The first towershaft 64 will continue to rotate in a direction originally provided by the starter generator assembly 76, however, the high speed spool driven towershaft 64 is rotating at a much higher speed and therefore spin past the speed input by the starter generator assembly 76. The first clutch 72 will not allow the transmission of this higher torque from the high speed spool 32 to accessory components other than the permanent magnet alternator 90 and the compressor 80.

Figure 10:
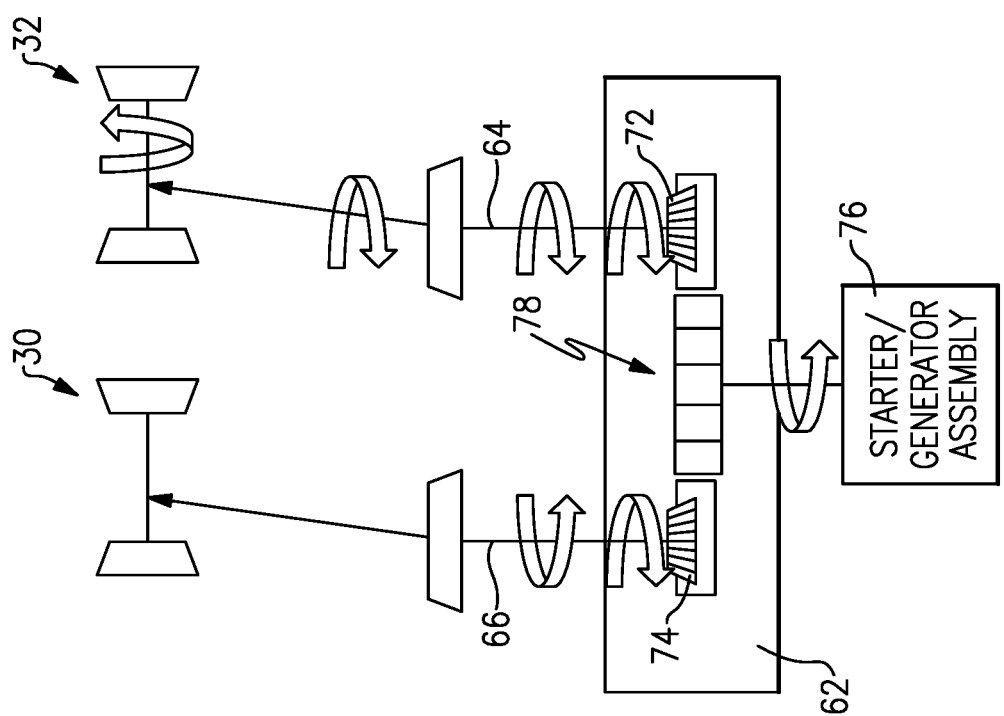
FIG. 10 is a schematic view of accessory gearbox operation during engine operation.

Once the high speed spool 32 has become operational, the low speed spool 30 will also begin to turn and shown in FIG. 10. Rotation of the high speed spool will result in turning of the second towershaft 66. The second towershaft 66 will in turn, turn the set of gears 78 through the second clutch 74 which will drive the starter generator assembly 76. Because the second clutch 74 is orientated and configured to enable the low speed spool 30 to drive the towershaft 66 and in turn drive the starter generator assembly 76.

Accordingly, once the engine is running, the starter generator assembly 76 may produce electric power to drive any number of accessory units. Moreover, once the engine is operational, the accessory components can be electrically powered by the starter generator assembly 76 or mechanically powered by the low speed spool 30.

In this example, the starter generator assembly 76 comprises two separate variable frequency generators. The variable frequency generators are each rated at 90 kVA in some examples. Notably, because since the starter generator assembly 76 can start the engine 20, no separate starter is required. When starting the engine 20, both starters can be powered to shorten start time. Prior to an engine start procedure, one of the starter-generators can be engaged to turn the high speed spool and reduced a bowed rotor start.

The variable frequency generators receives a rotational input to generate power utilized by components of the gas turbine engine 20. Other examples could incorporate other types of generators, and other types of electric machines. The transmission 92 facilitates incorporating the variable frequency generators rather than, for example, an integrated drive generator, since the transmission 92 permits operating the starter generator assembly 76 to operate in a narrower rpm range while still being driven by rotation of the inner shaft 40 through the second towershaft 66. Other examples, however, could include using one or more integrated drive generators as the starter generator assembly 76.

Driving the starter generator assembly 76 with the inner shaft 40 when generating power, rather than the outer shaft 50, can improve engine operability and performance. The exhaust gas temperature is also reduced as there is less power draw on the outer shaft 50.

The hydraulic pump 88 (FIG. 4) generally moves hydraulic fluid needed to move components of an air frame to which the gas turbine engine 20 is mounted. The transmission 92 permits operating the hydraulic pump 88 to be driven in a narrower rpm range while still being driven by rotation of the inner shaft 40 through the second towershaft 66.

Driving the hydraulic pump 88 with the inner shaft 40, rather than the outer shaft 50, can improve engine operability and performance. The exhaust gas temperature is also reduced as there is less power draw on the outer shaft 50.

The oil pump 84 is driven at a fixed ratio relative to the speed of the second towershaft 66. That is, switching the transmission 92 between the various modes does not substantially change a ratio of rotational speeds between the second towershaft 66 and the oil pump 84. Thus, as the rotational speed of the second towershaft 66 varies, the rotational input to the oil pump 84 varies linearly with the rotational speed of the second towershaft 66.

The oil pump 84 can be dedicated to supplying oil for all low rotor bearings whether roller, ball, or tapered bearings, and further including supplying oil for the geared architecture 48 or fan drive gear system. In another example, the oil pump 84 is dedicated to supplying oil to the low rotor bearing system 38', which incorporates bearings directly supporting the inner shaft 40. The bearings of the low rotor bearing system 38' are tapered bearings in some examples.

The rotational speed of the second towershaft 66 increases when the rotational speed of the inner shaft 40 increases. The inner shaft 40 may require additional lubrication, such as oil, directed to bearing systems 38 supporting the inner shaft 40 when the rotational speed of the inner shaft 40 increases.

The increased lubrication demands due to increasing the rotational speed of the inner shaft 40 are met by increasing the rotational input speed to the oil pump 84. In other words, the amount of oil moved to the bearing system 38' varies linearly with the rotational speed of the inner shaft 40. If the oil pump 84 were instead varying linearly with the rotational speed of the outer shaft 50, the oil pump 84 may move more oil than is required for lubrication. The excess oil would need to recirculated, or accommodated in some other way, which results in losses.

The oil pump 84 is considered a 60% oil pump as it accommodates approximately 60% of the lubrication requirements for the gas turbine engine 20. An additional pump, not shown, such as an electric pump, could be incorporated into the engine and powered by the starter generator assembly 76 to supply lubricant to other areas of the gas turbine engine 20.

The permanent magnet alternator 90 can be used to power the FADEC, which can include the EEC 96. As the FADEC is used during start up, the permanent magnet alternator 90 is also driven by the outer shaft 50.

Referring again to the oil pump 84, an added feature of coupling rotation of the oil pump 84 with rotation of the inner shaft 40 is that the inner shaft 40 spins with the fan 42. Thus, during a windmilling event when the fan 42 is spinning without being driven by the inner shaft 40, the oil pump 84 can continue to pump oil lubricating the bearings associated with the inner shaft 40. If the oil pump 84 were decoupled from rotation with the inner shaft 40, another pump or an electronic pump could be required to move oil to lubricate the fan 42 when windmilling.

Accordingly, some of the exemplary accessory gearboxes and related components enable the use of compact high speed spool systems to enhance efficiencies.

Some of the disclosed exemplary embodiments can be used to replace fuel and oil pumps with electrically powered on-demand fuel and oil pumps. In some examples, the fuel pump formerly driven by the accessory gearbox is replaced with a compressor that is part of an intercooled cooling air system.

Some of the exemplary embodiments can improve fuel burn over arrangements with a starter generator assembly driven in a generator mode by the high spool. Since the starter generators drive the high spool when the engine is started, and then transitioned away from the high spool, no additional starter on the high spool is required. Using the starter-generators can reduce idle thrust and ground/flight idle exhaust gas temperatures. The starter-generators can facilitate wing anti-ice.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine assembly comprising:
a first spool having a first turbine operatively mounted to a first turbine shaft;
a second spool having a second turbine operatively mounted to a second turbine shaft, the first and second turbines mounted for rotation about a common rotational axis within an engine static structure, the first and second turbine shafts coaxial with one another;
first and second towershafts respectively coupled to the first and second turbine shafts;
an accessory drive gearbox with a set of gears;
a compressor driven by the first towershaft;
a starter generator assembly; and
a transmission coupling the starter generator assembly to the set of gears, the transmission transitionable between a first mode where the starter generator assembly is driven at a first speed relative to the second towershaft, and a second mode where the starter generator assembly is driven at a different, second speed relative to the second towershaft; and
wherein the transmission is further transitionable to a third mode where the starter generator assembly is driven at a different, third speed relative to the second towershaft.

2. The gas turbine engine assembly of claim 1, wherein the first and second turbine shafts are outer and inner shafts, respectively, and the first and second turbines are high and low pressure turbines, respectively.

3. The gas turbine engine assembly of claim 2, wherein the first towershaft is configured to rotate at a higher speed than the second towershaft.

4. The gas turbine engine assembly of claim 1, wherein the transmission is further transitionable to at least one fourth mode where the starter generator assembly is driven at a fourth speed relative to the second towershaft, the fourth speed different than each of the first, second, and third speeds.

5. The gas turbine engine assembly of claim 1, further comprising:

a first clutch disposed between the first towershaft and the starter generator assembly, the first clutch configured to enable the starter generator assembly to drive the first spool through the accessory drive gearbox; and
a second clutch disposed between the second towershaft and the starter generator assembly, the second clutch configured to enable the second spool to drive the starter generator assembly through the accessory drive gearbox.

6. The gas turbine engine assembly of claim 5, wherein the first clutch and the second clutch are one-way mechanical clutch devices.

7. The gas turbine engine assembly of claim 5, wherein the compressor is a boost compressor of an intercooled cooling air system, and further comprising:
a fan section including a fan driven by the second turbine through a geared architecture, wherein the fan section drives air long a bypass flow path in a bypass duct;
a compressor section including a low pressure compressor and a high pressure compressor, the high pressure compressor driven by the first turbine, and the low pressure compressor driven by the second turbine through an epicyclic gear train;
wherein the fan section drives air long the bypass flow path in the bypass duct, a bypass ratio is defined as the volume of air passing into the bypass duct compared to the volume of air passing into the compressor section, and the bypass ratio is greater than 10;
wherein the first and second turbine shafts are outer and inner shafts, respectively, and the first and second turbines are high and low pressure turbines, respectively; and
wherein the first towershaft is configured to rotate at a higher speed than the second towershaft.

8. The gas turbine engine assembly of claim 7, wherein the compressor section has a downstream most end and a cooling air tap at a location spaced upstream from the downstream most end, wherein the cooling air tap is passed through the boost compressor and at least one heat exchanger, and then passed to a turbine section to cool the turbine section, and the turbine section comprises the high and low pressure turbines.

9. The gas turbine engine assembly of claim 1, wherein the compressor is a boost compressor of an intercooled cooling air system.

10. The gas turbine engine assembly of claim 9, further comprising a compressor section having a downstream most end and a cooling air tap at a location spaced upstream from said downstream most end, wherein the cooling air tap is passed through at least one boost compressor and at least one heat exchanger, and then passed to a turbine section to cool the turbine section.

11. The gas turbine engine assembly of claim 1, further comprising a fan driven by a speed reduction device, wherein the speed reduction device is driven by the second turbine shaft.

12. The gas turbine engine assembly of claim 1, wherein the starter generator assembly comprises a first variable frequency generator and a second variable frequency generator.

13. The gas turbine engine assembly of claim 1, wherein the starter generator assembly comprises a first integrated drive generator and a second integrated drive generator.

14. A method of operating a gas turbine engine, comprising:

driving a first spool with a starter generator assembly through a first towershaft and a first clutch to start the engine;

driving the starter generator assembly through an accessory gearbox through a second clutch with a second towershaft coupled to a second spool once the engine is started; and driving a compressor through the accessory gearbox with the first towershaft once the engine is started.

15. The method of claim 14, further comprising decoupling the starter generator assembly from the first spool once the first spool reaches an engine idle speed.

16. The method of claim 15, wherein the decoupling includes rotating the second towershaft at a speed greater than that of the starter generator assembly.

17. The method of claim 14, wherein the compressor is a boost compressor of an intercooled cooling air system.

18. The method of claim 17, further comprising a compressor section having a downstream most end and a cooling air tap at a location spaced upstream from said downstream most end, wherein the cooling air tap is passed through the boost compressor and at least one heat exchanger, and then passed to a turbine section to cool the turbine section.

19. The method of claim 18, wherein the compressor section includes a low pressure compressor and a high pressure compressor, the low pressure compressor driven by a low pressure turbine and the high pressure compressor driven by a high pressure turbine, the first spool comprising the high pressure compressor and the high pressure compressor, and the second spool comprising the low pressure compressor and the low pressure turbine, and further comprising:

driving the starter generator assembly through the accessory gearbox through the second clutch with the second towershaft subsequent to the step of decoupling the starter generator assembly from the first spool; and driving the boost compressor through the accessory gearbox with the first towershaft subsequent to the step of decoupling the starter generator assembly from the first spool.

20. The method of claim 14, further comprising:

driving the starter generator assembly through a transmission in a first mode so that the starter generator assembly is rotated at a first speed relative to the second towershaft; and transitioning the transmission to a second mode so that the starter generator assembly is driven by the second towershaft and rotated at a different, second speed relative to the second towershaft.

21. The method of claim 20, further comprising transitioning the transmission to a third mode; and driving the transmission with the second towershaft to rotate the starter generator assembly at a different, third speed relative to the second towershaft.

22. The method of claim 14, further comprising driving a fan through a speed reduction device with a shaft of the second spool.

* * * * *